(12) United States Patent
Li et al.

(10) Patent No.: US 12,267,487 B2
(45) Date of Patent: *Apr. 1, 2025

(54) METHOD AND DEVICE FOR CONFIGURING MPM LIST

(71) Applicant: LG ELECTRONICS INC., Seoul (KR)

(72) Inventors: Ling Li, Seoul (KR); Jin Heo, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/644,760

(22) Filed: Apr. 24, 2024

(65) Prior Publication Data

US 2024/0275952 A1    Aug. 15, 2024

Related U.S. Application Data

(63) Continuation of application No. 17/436,964, filed as application No. PCT/KR2019/018308 on Dec. 23, 2019, now Pat. No. 12,010,292.

(60) Provisional application No. 62/817,534, filed on Mar. 12, 2019.

(51) Int. Cl.
*H04N 19/105* (2014.01)
*H04N 19/107* (2014.01)
*H04N 19/11* (2014.01)
*H04N 19/132* (2014.01)
*H04N 19/172* (2014.01)
*H04N 19/176* (2014.01)

(52) U.S. Cl.
CPC ......... *H04N 19/105* (2014.11); *H04N 19/107* (2014.11); *H04N 19/11* (2014.11); *H04N 19/132* (2014.11); *H04N 19/172* (2014.11); *H04N 19/176* (2014.11)

(58) Field of Classification Search
None
See application file for complete search history.

(56) References Cited

U.S. PATENT DOCUMENTS

2017/0332084 A1* 11/2017 Seregin ............... H04N 9/8045
2021/0274167 A1*  9/2021 Liu ..................... H04N 19/107

* cited by examiner

*Primary Examiner* — Lindsay J Uhl
(74) *Attorney, Agent, or Firm* — Bryan Cave Leighton Paisner LLP

(57) ABSTRACT

A method for decoding a video performed by a decoding device according to the present disclosure, comprises: a step for deriving a prediction mode of a neighboring block of a current block; a step for deriving an intra prediction mode candidate for configuring an MPM list on the basis of the derived prediction mode of the neighboring block; a step for configuring the MPM list on the basis of the derived intra prediction mode candidate; a step for determining an intra prediction mode for the current block on the basis of the configured MPM list; a step for deriving prediction samples for the current block on the basis of the determined intra prediction mode for the current block; and a step for generating a reconstructed picture on the basis of the prediction samples.

3 Claims, 14 Drawing Sheets

DECODING APPARATUS

METHOD AND DEVICE FOR CONFIGURING MPM LIST

CROSS-REFERENCE TO RELATED APPLICATIONS

This application is a Continuation of U.S. application Ser. No. 17/436,964 filed on Sep. 7, 2021, which is a National Stage filing under 35 U.S.C. 371 of International Application No. PCT/KR2019/018308, with an international filing date of Dec. 23, 2019, which claims the benefit of U.S. Provisional Application No. 62/817,534, filed on Mar. 12, 2019, all of which are incorporated by reference in their entirety herein.

BACKGROUND OF THE DISCLOSURE

Field of the Disclosure

The present disclosure relates to an image coding technology, and more particularly, to a method and an apparatus for configuring a most probable mode (MPM) list in an image coding system.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

An aspect of the present disclosure is to provide a method and an apparatus for enhancing image coding efficiency.

Another aspect of the present disclosure is to provide a method and an apparatus for configuring an MPM list.

Still another aspect of the present disclosure is to provide a method and an apparatus for deriving an intra planar mode as an intra prediction mode candidate for configuring an MPM list in case that a prediction mode of a neighboring block of a current block is not for intra prediction.

Yet still another aspect of the present disclosure is to provide a method and an apparatus for deriving an intra planar mode as an intra prediction mode candidate for configuring an MPM list without determining whether a prediction mode of a neighboring block is for a combined intra inter prediction (CIIP) in case that the prediction mode of the neighboring block of a current block is not for intra prediction.

According to one exemplary embodiment of the present disclosure, an image decoding method performed by a decoding apparatus is provided. The method includes deriving a prediction mode of a neighboring block of a current block, deriving an intra prediction mode candidate for configuring an MPM list based on the derived prediction mode of the neighboring block, configuring the MPM list based on the derived intra prediction mode candidate, determining an intra prediction mode for the current block based on the configured MPM list, deriving prediction samples for the current block based on the determined intra prediction mode for the current block, and generating a reconstructed picture based on the prediction samples, wherein the deriving the intra prediction mode candidate includes deriving an INTRA PLANAR mode as the intra prediction mode candidate based on a determination that the prediction mode of the neighboring block is not for intra prediction.

According to another exemplary embodiment of the present disclosure, a decoding apparatus performing image decoding is provided. The decoding apparatus includes a predictor configured to derive a prediction mode of a neighboring block of a current block, derive an intra prediction mode candidate for configuring an MPM list based on the derived prediction mode of the neighboring block, configure the MPM list based on the derived intra prediction mode candidate, determine an intra prediction mode for the current block based on the configured MPM list, and derive prediction samples for the current block based on the determined intra prediction mode for the current block, and an adder configured to generate a reconstructed picture based on the prediction samples, wherein the predictor derives an INTRA PLANAR mode as the intra prediction mode candidate based on a determination that the prediction mode of the neighboring block is not for intra prediction.

According to still another exemplary embodiment of the present disclosure, an image encoding method performed by an encoding apparatus is provided. The method includes deriving a prediction mode of a neighboring block of a current block, deriving an intra prediction mode candidate for configuring an MPM list based on the derived prediction mode of the neighboring block, configuring the MPM list based on the derived intra prediction mode candidate, determining an intra prediction mode for the current block based on the configured MPM list, deriving prediction samples for the current block based on the determined intra prediction mode for the current block; deriving residual samples for the current block based on the prediction samples, and encoding image information including information on the residual samples, wherein the deriving the intra prediction mode candidate includes deriving an INTRA PLANAR mode as the intra prediction mode candidate based on a determination that the prediction mode of the neighboring block is not for intra prediction.

According to yet still another exemplary embodiment of the present disclosure, an encoding apparatus performing image encoding is provided. The encoding apparatus includes a predictor configured to derive a prediction mode of a neighboring block of a current block, derive an intra prediction mode candidate for configuring an MPM list based on the derived prediction mode of the neighboring block, configure the MPM list based on the derived intra prediction mode candidate, determine an intra prediction mode for the current block based on the configured MPM list, and derive prediction samples for the current block based on the determined intra prediction mode for the current block, a residual processor configured to derive residual samples for the current block based on the prediction samples; and an entropy encoder configured to encode image information including information on the residual samples, wherein the predictor derives an INTRA PLANAR mode as the intra prediction mode candidate based on a determination that the prediction mode of the neighboring block is not for intra prediction.

According to yet still another exemplary embodiment of the present disclosure, a decoder-readable storage medium storing information on instructions for causing a video decoding apparatus to perform decoding methods according to some exemplary embodiments is provided.

According to yet still another exemplary embodiment of the present disclosure, a decoder-readable storage medium storing information on instructions for causing a video decoding apparatus to perform a decoding method according to an exemplary embodiment is provided. The decoding method includes: deriving a prediction mode of a neighboring block of a current block; deriving an intra prediction mode candidate for configuring an MPM list based on the derived prediction mode of the neighboring block; configuring the MPM list based on the derived intra prediction mode candidate; determining an intra prediction mode for the current block based on the configured MPM list; deriving prediction samples for the current block based on the determined intra prediction mode for the current block; and generating a reconstructed picture based on the prediction samples, wherein the deriving the intra prediction mode candidate includes deriving an INTRA PLANAR mode as the intra prediction mode candidate based on a determination that the prediction mode of the neighboring block is not for intra prediction.

According to the present disclosure, the overall image/video compression efficiency can be enhanced.

According to the present disclosure, an image coding efficiency can be enhanced by performing image coding based on the MPM list.

According to the present disclosure, an image coding efficiency can be enhanced by configuring the MPM list based on the prediction mode of the neighboring block of the current block.

According to the present disclosure, the intra planar mode can be derived as the intra prediction mode candidate for configuring the MPM list in case that the prediction mode of the neighboring block of the current block is not for the intra prediction.

According to the present disclosure, the intra planar mode can be derived as the intra prediction mode candidate for configuring the MPM list in a state where it is not determined whether the prediction mode of the neighboring block is for the CIIP in case that the prediction mode of the neighboring block of the current block is not for the intra prediction.

DESCRIPTION OF EXEMPLARY EMBODIMENTS

Figure 1:
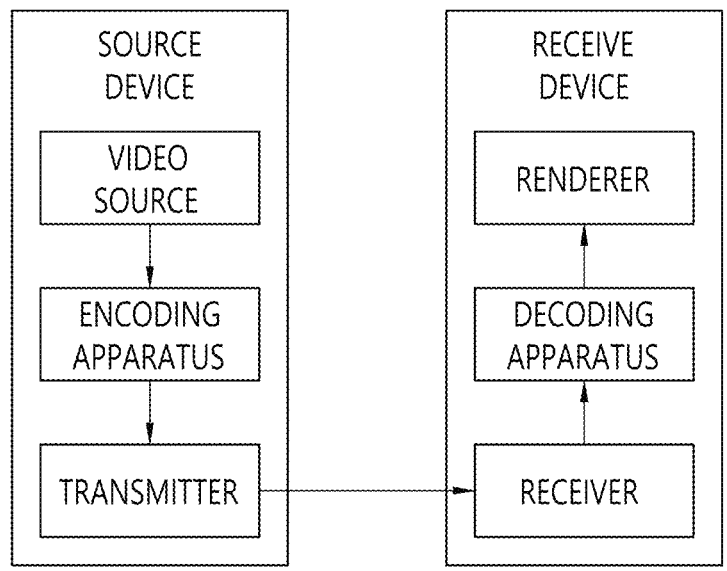
FIG. 1 schematically illustrates an example of a video/image coding system to which the present disclosure is applicable.

According to one exemplary embodiment of the present disclosure, an image decoding method performed by a decoding apparatus is provided. The method includes deriving a prediction mode of a neighboring block of a current block, deriving an intra prediction mode candidate for configuring an MPM list based on the derived prediction mode of the neighboring block, configuring the MPM list based on the derived intra prediction mode candidate, determining an intra prediction mode for the current block based on the configured MPM list, deriving prediction samples for the current block based on the determined intra prediction mode for the current block, and generating a reconstructed picture based on the prediction samples, wherein the deriving the intra prediction mode candidate includes deriving an INTRA PLANAR mode as the intra prediction mode candidate based on a determination that the prediction mode of the neighboring block is not for intra prediction.

The present disclosure may be modified in various forms, and specific embodiments thereof will be described and illustrated in the drawings. However, the embodiments are not intended for limiting the present disclosure. The terms used in the following description are used to merely describe specific embodiments, but are not intended to limit the present disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

In addition, each configuration of the drawings described in the present disclosure is an independent illustration for explaining functions as features that are different from each other, and does not mean that each configuration is implemented by mutually different hardware or different software. For example, two or more of the configurations can be combined to form one configuration, and one configuration can also be divided into multiple configurations. Without departing from the gist of the present disclosure, embodiments in which configurations are combined and/or separated are included in the scope of the present disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 illustrates an example of a video/image coding system to which the present disclosure may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present disclosure relates to video/image coding. For example, a method/embodiment disclosed in the present disclosure may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

The present disclosure suggests various embodiments of video/image coding, and the above embodiments may also be performed in combination with each other unless otherwise specified.

In the present disclosure, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture (a brick may represent a rectangular region of CTU rows within a tile in a picture). A tile may be partitioned into a multiple bricks, each of which may be constructed with one or more CTU rows within the tile (A tile may be partitioned into multiple bricks, each of which consisting of one or more CTU rows within the tile). A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture (A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture). A tile is a particular tile column and a rectangular region of CTUs within a particular tile column (A tile is a rectangular region of CTUs within a particular tile column and a particular tile row in a picture). The tile column is a rectangular region of CTUs, which has a height equal to the height of the picture and a width that may be specified by syntax elements in the picture parameter set (The tile column is a rectangular region of CTUs having a height equal to the height of the picture and a width specified by syntax elements in the picture parameter set). The tile row is a rectangular region of CTUs, which has a width specified by syntax elements in the picture parameter set and a height that may be equal to the height of the picture (The tile row is a rectangular region of CTUs having a height specified by syntax elements in the picture parameter set and a width equal to the width of the picture). A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice may include an integer number of bricks of a picture, and the integer number of bricks may be included in a single NAL unit (A slice includes an integer number of bricks of a picture that may be exclusively contained in a single NAL unit). A slice may be constructed with multiple complete tiles, or may be a consecutive sequence of complete bricks of one tile (A slice may consists of either a number of complete tiles or only a consecutive sequence of complete bricks of one tile). In the present disclosure, a tile group and a slice may be used in place of each other. For example, in the present disclosure, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present disclosure, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in the present disclosure should be interpreted to indicate "additionally or alternatively."

Figure 2:
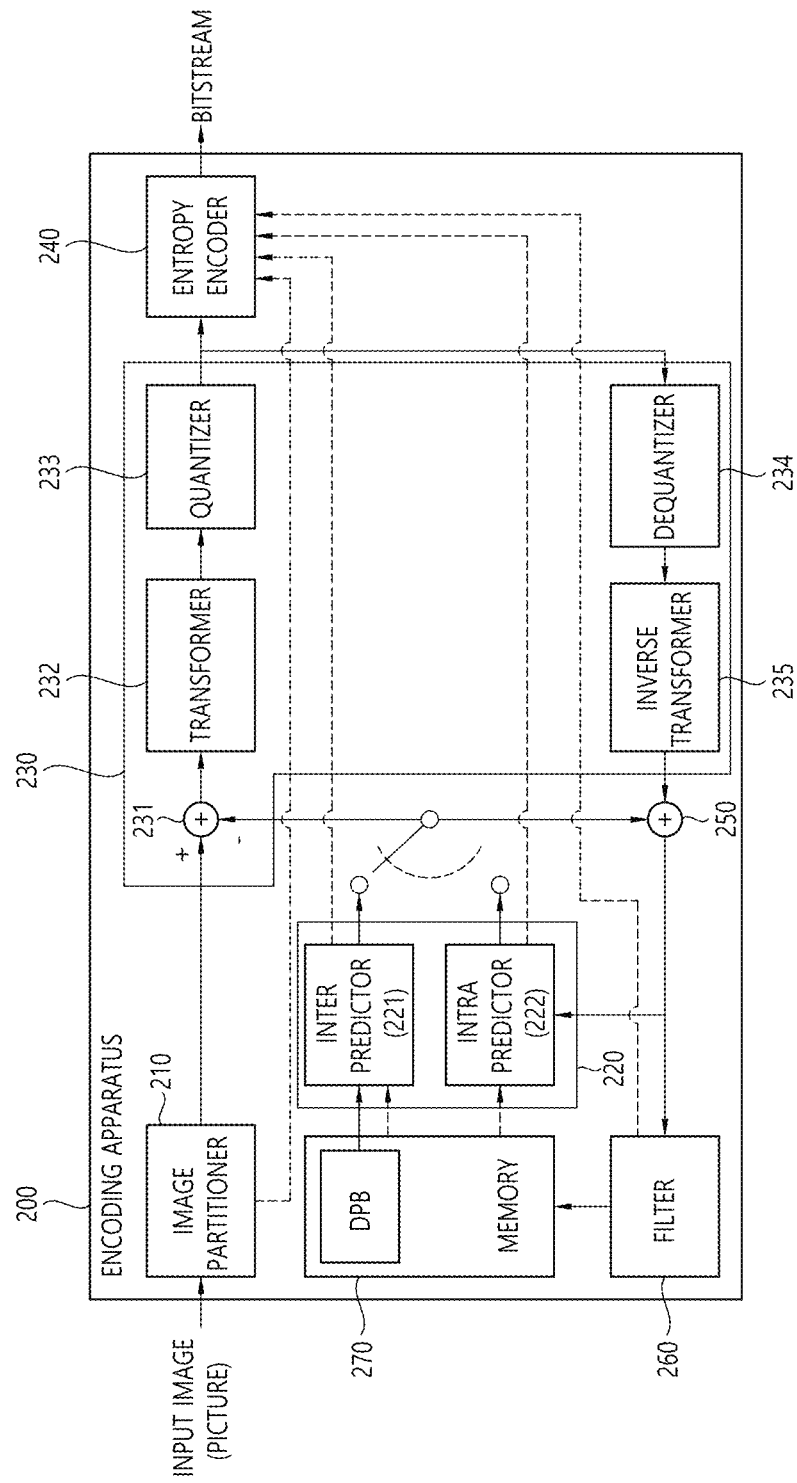
FIG. 2 is a diagram schematically explaining the configuration of a video/image encoding apparatus to which the present disclosure is applicable.

FIG. 2 is a diagram schematically illustrating a configuration of a video/image encoding apparatus to which the present disclosure may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal. The transformer 232 may generate transform coefficients by applying the transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in the present disclosure may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various kinds of filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
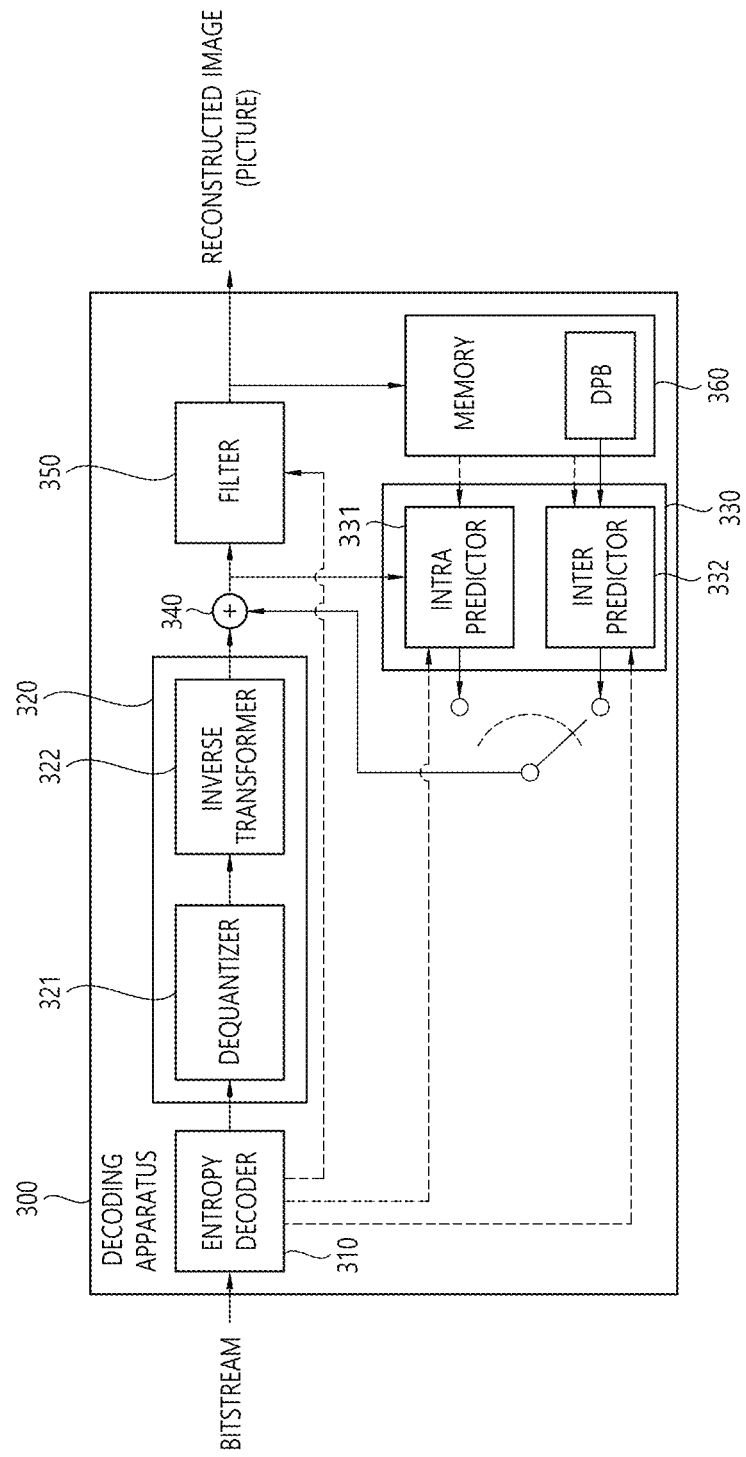
FIG. 3 is a diagram schematically explaining the configuration of a video/image decoding apparatus to which the present disclosure is applicable.

FIG. 3 is a diagram for schematically explaining a configuration of a video/image decoding apparatus to which the present disclosure is applicable.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in the present disclosure may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, and residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to the present disclosure may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present specification, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Figure 4:
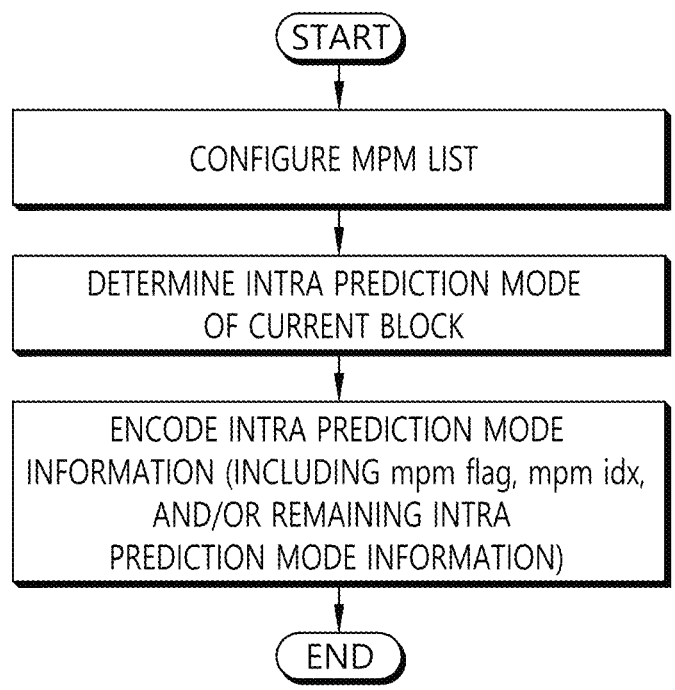
FIG. 4 is a flowchart illustrating an example of a method in which an encoding apparatus according to an embodiment signals intra prediction mode information.

FIG. 4 is a flowchart illustrating an example of a method in which an encoding apparatus according to an embodiment signals intra prediction mode information.

In case that intra prediction is applied, an intra prediction mode being applied to a current block may be determined using an intra prediction mode of a neighboring block. For example, a decoding apparatus may select, based on a received mpm index, one of the mpm candidates (or intra prediction mode candidates) in a most probable mode (mpm) list derived based on an intra prediction mode of neighboring blocks (e.g., left and/or top neighboring blocks) of the current block and additional candidate modes, or may select one of remaining intra prediction modes being not included in the mpm candidates based on remaining intra prediction mode information. For example, whether the intra prediction mode being applied to the current block exists in the mpm candidates or in the remaining mode may be indicated based on an mpm flag (e.g., intra_luma_mpm_flag). A case that the mpm flag value is 1 may represent that the intra prediction mode of the current block exists in the mpm candidates (mpm list), and a case that the mpm flag value is 0 may represent that the intra prediction mode of the current block does not exist in the mpm candidates (mpm list). The mpm index may be signaled in the form of mpm_idx or intra_luma_mpm_idx syntax elements, and the remaining intra prediction mode information may be signaled in the form of rem_intra_luma_pred_mode or intra_luma_mpm_remainder syntax elements. For example, the remaining intra prediction mode information may indicate one of the remaining intra prediction modes being not included in the mpm candidates among the entire intra prediction modes through indexing of the remaining intra prediction modes in the order of prediction mode number. The intra prediction mode may be an intra prediction mode for luma components (samples). Hereinafter, the intra prediction mode information may include at least one of the mpm flag (e.g., intra_luma_mpm_flag), the mpm index (e.g., mpm_idx or intra-luma_mpm_idx), and the remaining intra prediction mode information (e.g., rem_intra_luma_pred_mode or intra_luma_mpm_remainder). In the present disclosure, the MPM list may be called various terms, such as MPM candidate list, candModeList, and the like.

The intra prediction mode signaling procedure by the encoding apparatus and the intra prediction mode determination procedure by a decoding apparatus may be performed, for example, as follows.

Referring to FIG. 4, the encoding apparatus may first configure the MPM list for the current block. The MPM list may include intra prediction mode candidates (MPM candidates) which are more likely to be applied to the current block. The MPM list may also include the intra prediction mode of the neighboring block, and further include specific intra prediction modes according to a predetermined method as well. A specific method for configuring the MPM list will be described later.

The encoding apparatus may determine the intra prediction mode of the current block. The encoding apparatus may perform the prediction based on various intra prediction modes, and determine an optimal intra prediction mode based on rate-distortion optimization (RDO) based on the above prediction. In this case, the encoding apparatus may determine the optimal intra prediction mode using only the MPM candidates configured in the MPM list, or determine the optimal intra prediction mode further using the remaining intra prediction modes as well as the MPM candidates configured in the MPM list. Specifically, for example, if the intra prediction type of the current block is a specific type (e.g., LIP, MRL, or ISP), the encoding apparatus may determine the optimal intra prediction mode in consideration of only the MPM candidates as the intra prediction mode candidates for the current block. That is, in this case, the intra prediction mode for the current block may be determined only in the MPM candidates, and in this case, the mpm flag may be not encoded/signaled. In this case, the decoding apparatus may estimate that the mpm flag is 1 even without separate signaling of the mpm flag.

Generally, if the intra prediction mode of the current block is one of the MPM candidates in the MPM list, the encoding apparatus may generate the mpm index (mpm idx) indicating one of the MPM candidates. If the intra prediction mode of the current block does not exist in the MPM list, the encoding apparatus may generate the remaining intra prediction mode information indicating a mode such as the intra prediction mode of the current block among the remaining intra prediction modes being not included in the MPM list.

The encoding apparatus may encode the intra prediction mode information and output the encoded information in the form of a bitstream. The intra prediction mode information may include the above-described mpm flag, mpm index, and/or remaining intra prediction mode information. Generally, the mpm index and the remaining intra prediction mode information may have an alternative relationship and may not be simultaneously signaled when indicating the intra prediction mode for one block. That is, the mpm flag value of 1 and the mpm index may be signaled together, or the mpm flag value of 0 and the remaining intra prediction mode information may be signaled together. However, as described above, if the specific intra prediction type is applied to the current block, the mpm flag may not be signaled, and only the mpm index may be signaled. That is, in this case, the intra prediction mode information may include only the mpm index.

Figure 5:
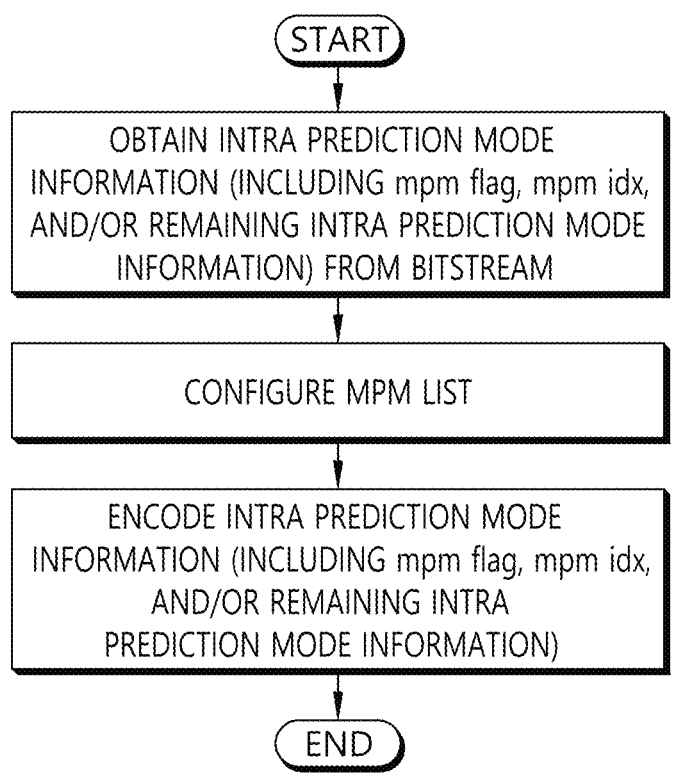
FIG. 5 is a flowchart illustrating an example of a method in which a decoding apparatus according to an embodiment signals intra prediction mode information.

FIG. 5 is a flowchart illustrating an example of a method in which a decoding apparatus according to an embodiment signals intra prediction mode information.

The decoding apparatus may determine the intra prediction mode corresponding to the intra prediction mode information determined and signaled by the encoding apparatus.

Referring to FIG. 5, the decoding apparatus may obtain the intra prediction mode information from the bitstream. As described above, the intra prediction mode information may include at least one of the mpm flag and the mpm index remaining intra prediction mode.

The decoding apparatus may configure the MPM list. The MPM list may be configured in the same manner as the MPM list configured by the encoding apparatus. That is, the MPM list may include the intra prediction mode of the neighboring block, and further include the specific intra prediction modes according to a predetermined method. A specific method for configuring the MPM list will be described later.

Although it is illustrated in FIG. 5 that the configuring the MPM list is performed later than the obtaining the intra prediction mode information from the bitstream, it is illustrative, and S1410 may be performed earlier than S1400, or they may be simultaneously performed.

The decoding apparatus may determine the intra prediction mode of the current block based on the MPM list and the intra prediction mode information. Meanwhile, a detailed procedure of deriving (or determining) the intra prediction mode is exemplarily represented in a flowchart of FIG. 6 below.

Figure 6:
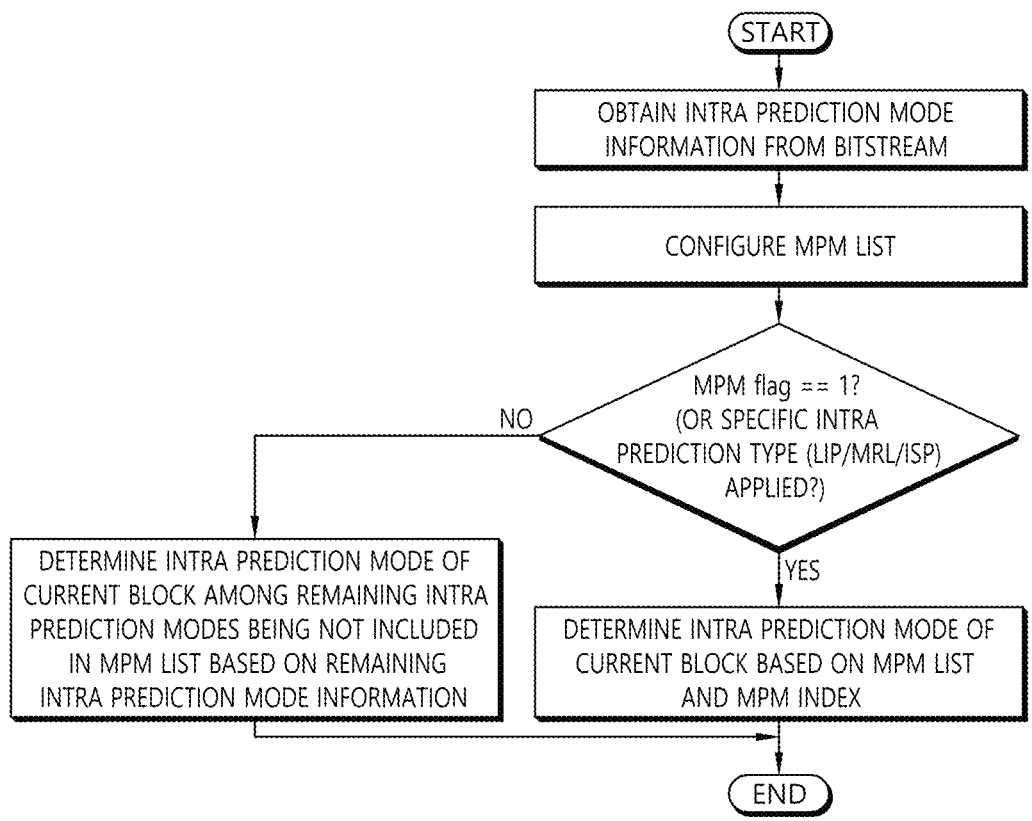
FIG. 6 is a flowchart illustrating an example of a method in which a decoding apparatus according to an embodiment determines an intra prediction mode.

FIG. 6 is a flowchart illustrating an example of a method in which a decoding apparatus according to an embodiment determines an intra prediction mode.

As an example, if the mpm flag value is 1, the decoding apparatus may derive the candidate indicated by the mpm index among the MPM candidates in the MPM list as the intra prediction mode of the current block. As another example, if the mpm flag value is 0, the decoding apparatus may derive the intra prediction mode indicated by the remaining intra prediction mode information among the remaining intra prediction modes, which are not included in the MPM list, as the intra prediction mode of the current block. Meanwhile, as still another example, if the intra prediction type of the current block is the specific type (e.g., LIP, MRL, or ISP), the decoding apparatus may derive the candidate indicated by the mpm index in the MPM list as the intra prediction mode of the current block without confirming (or checking) the mpm flag.

Figure 7:
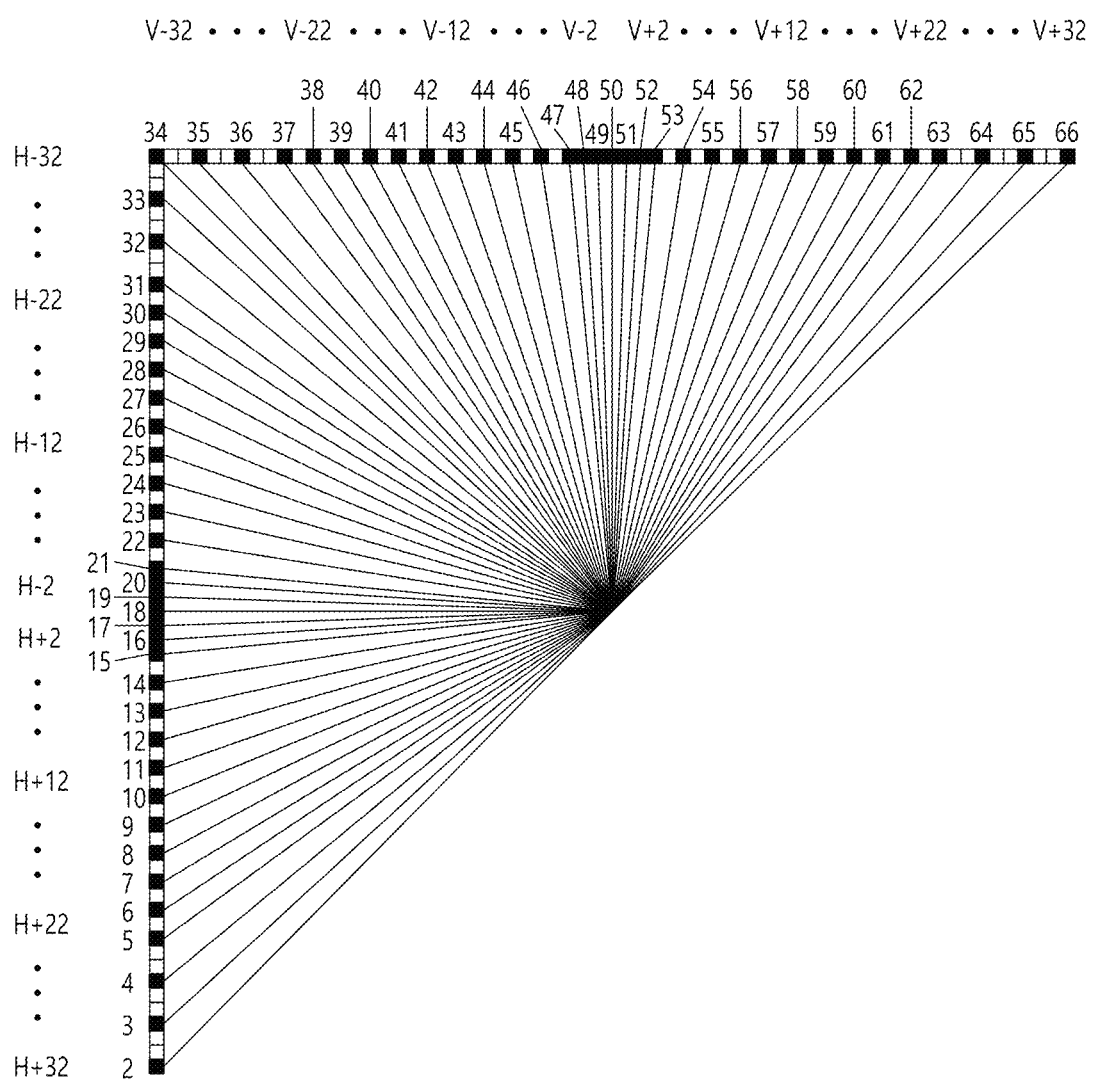
FIG. 7 is a diagram illustrating an example of directional intra prediction modes.

FIG. 7 is a diagram illustrating an example of directional intra prediction modes.

In an embodiment, in order to capture a certain edge direction proposed in natural video, 65 directional intra prediction modes may be configured as in FIG. 7. In this case, the intra prediction modes may include 2 non-directional intra prediction modes and 65 directional intra prediction modes. The non-directional intra prediction modes may include a planar intra prediction mode and a DC intra prediction mode, and the directional intra prediction modes may include No. 2 to No. 66 intra prediction modes. The intra prediction based on the 65 directional intra prediction modes may be applied to blocks having all sizes, and may be applied to both a luma component and a chroma component.

Further, the intra prediction modes may include 2 non-directional intra prediction modes and 129 directional intra prediction modes. The non-directional intra prediction modes may include the planar intra prediction mode and the DC intra prediction mode, and the directional intra prediction modes may include No. 2 to No. 130 intra prediction modes.

Meanwhile, the intra prediction modes may further include a cross-component linear model (CCLM) mode for a chroma sample in addition to the above-described intra prediction modes. The CCLM mode may be divided into LT_CCLM, L_CCLM, and T_CCLM depending on whether left samples, top samples, or both of the left and top samples are considered to derive LM parameters, and the CCLM mode may be applied to the chroma component only.

The intra prediction modes may be indexed, for example, as in Table 1 below.

TABLE 1

| Intra prediction mode | Associated name |
| --- | --- |
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

Meanwhile, the intra prediction type (or additional intra prediction mode) may include at least one of LIP, PDPC, MRL, and ISP as described above. The intra prediction type may be indicated based on the intra prediction type information, and the intra prediction type information may be implemented in various forms. In an embodiment, the intra prediction type information may include intra prediction type index information indicating one of the intra prediction types. In another embodiment, the intra prediction type information may include at least one of reference sample line information (e.g., intra_luma_ref_idx) representing whether the MRL is applied to the current block and which reference sample line is used in case that the MRL is applied to the current block, ISP flag information (e.g., intra_subpartitions_mode_flag) representing whether the ISP is applied to the current block, ISP type information (e.g., intra_subpartitions_split_flag) in which subpartitions indicate split types in case that the ISP is applied, flag information representing whether the PDCP is applied, or flag information representing whether the LIP is applied.

Figure 8:
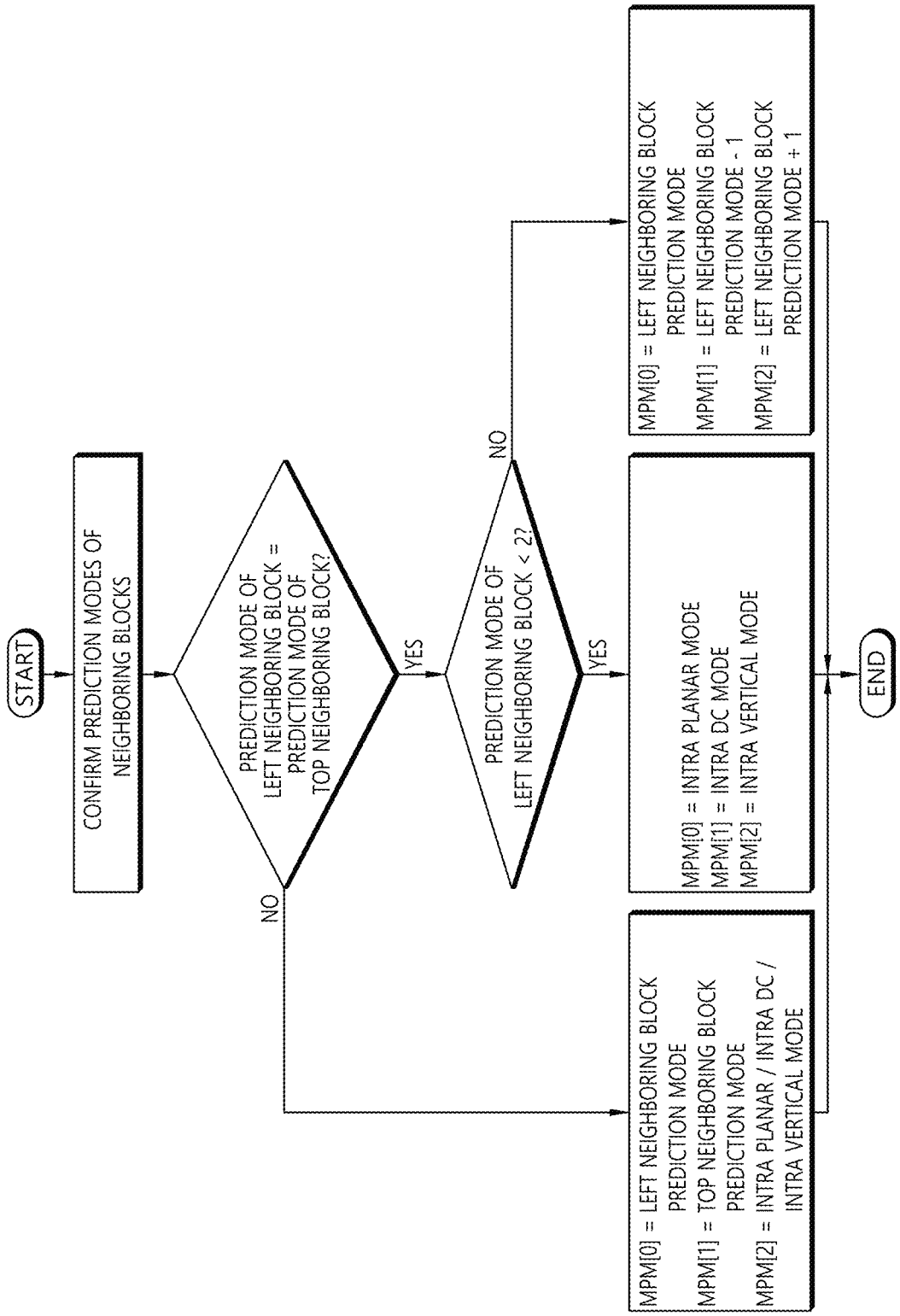
FIG. 8 is a flowchart illustrating an example of a method for configuring an MPM list.

FIG. 8 is a flowchart illustrating an example of a method for configuring an MPM list.

In general, in case that block split for an image is performed, a current block to be coded and a neighboring block have similar image characteristics. Accordingly, the current block and the neighboring block are more likely to have the same or similar intra prediction modes. Accordingly, an encoder may use the intra prediction mode of the neighboring block in order to encode the intra prediction mode of the current block.

For example, an encoder/decoder may configure a most probable mode (MPM) list for the current block. The MPM list may also be represented as an MPM candidate list. Here, the MPM may mean a mode being used to enhance coding efficiency in consideration of similarity between the current block and the neighboring block during intra prediction mode coding. In this case, in order to keep low complexity of MPM list generation, a method for configuring an MPM list including 3 MPMs may be used. For example, even in case of using 67 intra prediction modes, the MPM list may include 3 MPM candidates. In case that the intra prediction mode for the current block is not included in the MPM list, a remaining mode may be used. In this case, the remaining mode may include 64 remaining candidates, and remaining intra prediction mode information indicating one of the 64 remaining candidates may be signaled. For example, the remaining intra prediction mode information may include a 6-bit syntax element (e.g., rem_intra_luma_pred_mode syntax element).

The flowchart of FIG. 8 illustrates an example of a method for encoding the intra prediction mode. In order to configure the MPM list, the following three kinds of modes, that is, neighboring intra modes, derived intra modes, and default intra modes, may be considered.

First, in general, in case that the block split for the image is performed, the current block to be coded and the neighboring block may have similar image characteristics. In case of the intra prediction mode, the current block and the neighboring block may be more likely to have the same or similar intra prediction modes. Accordingly, the encoding apparatus may use the prediction mode of the neighboring block in order to encode the prediction mode of the current block.

In case that the neighboring block is intra-coded, the encoding apparatus (or encoder) may confirm or induce the prediction mode of the neighboring block. For example, the prediction mode of the current block may be determined based on the prediction mode of the left neighboring block and the prediction mode of the top neighboring block, and in this case, the prediction mode of the corresponding neighboring block may be determined as the most probable modes (MPMs). The determination of the MPMs may be expressed as list up of the most probable mode (MPM) candidates (or MPM list).

The encoding apparatus may confirm whether the prediction mode of the left neighboring block is equal to the prediction mode of the top neighboring block. An initial MPM list may be formed by performing a pruning process with respect to the intra prediction modes of the two adjacent blocks.

If the prediction mode of the left neighboring block is not equal to the prediction mode of the top neighboring block, the first MPM may be configured as the prediction mode of the left neighboring block, the second MPM may be configured as the prediction mode of the top neighboring block, and the third MPM may be configured as any one of an intra planar mode, an intra DC mode, or an intra vertical mode (No. 50 intra prediction mode). Specifically, if the intra prediction modes of the two neighboring blocks are different from each other, the two intra prediction modes may be configured as the MPM, and one of the default intra modes may be added to the MPM list after pruning check by the MPMs. Here, the default intra modes may include the intra planar mode, the intra DC mode, and/or the intra vertical mode (No. 50 intra prediction mode). For example, if the prediction mode of the left neighboring block is not equal to the prediction mode of the top neighboring block, the MPM list may be configured as in Table 2 below.

TABLE 2

Otherwise (i.e., A is not equal to B),
  If neither of A and B is equal to 0, candModeList [3] = { A, B, 0}.
  Otherwise, if neither of A and B is equal to 1, candModeList [3] = { A, B, 1}.
  Otherwise, candModeList [3] = { A, B, 50}.

In Table 2, A may represent the intra prediction mode of the left neighboring block, B may represent the intra prediction mode of the top neighboring block, 0 may represent the intra planar mode, 1 may represent the intra DC mode, 50 may represent the intra vertical mode, and candModeList may represent the MPM list.

Meanwhile, if the prediction mode of the left neighboring block is equal to the prediction mode of the top neighboring block, the encoder may confirm whether the prediction mode of the left neighboring block is less than 2.

If the prediction mode of the left neighboring block is less than 2, the first MPM may be configured as the intra planar mode, the second MPM may be configured as the intra DC mode, and the third MPM may be configured as the intra vertical mode (No. 50 intra prediction mode).

Meanwhile, if the prediction mode of the left neighboring block is not less than 2, the first MPM may be configured as the prediction mode of the left neighboring block, the second MPM may be configured as (the prediction mode of the left neighboring block −1), and the third MPM may be configured as (the prediction mode of the left neighboring block +1).

For example, if the prediction mode of the left neighboring block and the prediction mode of the top neighboring block are the same, the MPM list may be configured as in Table 3 below.

TABLE 3

If two neighboring candidate modes (i.e., A == B) are same,
  If A is less than 2, candModeList [3] = { 0, 1, 50}.
  Otherwise, candModeList[ 0 ] = {A, 2 + ( ( A + 61 ) % 64 ), 2 + ( ( A − 1) % 64 )}

Here, A may represent the intra prediction mode of the left neighboring block, B may represent the intra prediction mode of the top neighboring block, 0 may represent the intra planar mode, 1 may represent the intra DC mode, 50 may represent the intra vertical mode, and candModeList may represent the MPM list.

Meanwhile, an additional pruning process for removing duplicate modes may be performed so that only unique modes can be included. Further, for entropy coding of 64 non-MPM modes excluding the three MPMs, a 6-bit fixed length code may be used. That is, an index representing the 64 non-MPM modes may be entropy-coded by the 6-bit fixed length code (6-bit FLC).

Further, the encoder may determine whether an optimum intra prediction mode to be applied to the current block belongs to the previously configured MPM candidates.

If the intra prediction mode of the current block belongs to the MPM candidates, the encoder may encode an MPM flag and an MPM index. Here, the MPM flag may indicate whether the intra prediction mode of the current block is induced from the neighboring intra-predicted block (i.e., whether the intra prediction mode of the current block belongs to the MPMs). Further, the MPM index may represent which MPM mode is applied as the intra prediction mode of the current block among the MPM candidates.

In contrast, if the intra prediction mode of the current block does not belong to the MPM candidates, the encoder may encode the intra prediction mode of the current block.

Meanwhile, the encoder/decoder may configure an MPM list including 6 MPMs. In order to configure the MPM list, default intra modes, neighboring intra modes, and derived intra modes may be considered.

For the neighboring intra modes, two neighboring blocks, that is, a left neighboring block A and a top neighboring block B may be considered.

In order to generate an MPM list including 6 MPMs, an initialized default MPM list based on Table 4 below may be considered.

TABLE 4

Default 6 MPM modes = {A, Planar (0) or DC (1), Vertical (50), HOR (18), VER − 4 (46), VER + 4 (54)}
After that 6 MPM modes are updated performing pruning process for two neighboring intra modes. If two neighboring modes are the same each other and the neighboring mode is greater than DC (1) mode, 6 MPM modes are to include three default modes (A, Planar, DC) and three derived modes which are obtained by adding predefined offset values to the neighboring mode and performing modular operation. Otherwise, if two neighboring modes are different, two neighboring modes are assigned to first two MPM modes and the rest four MPM modes are derived from default modes and neighboring modes. During 6 MPM list generation process, pruning is used to remove duplicated modes so that only unique modes can be included into the MPM list. For entropy coding of the 61 non-MPM modes, a Truncated Binary Code (TBC) is used.

Figure 9:
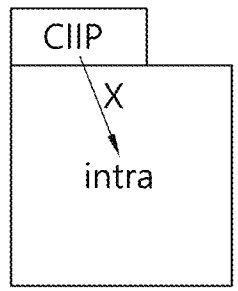
FIG. 9 is a diagram explaining a method for excluding an intra prediction mode of a neighboring block performing CIIP when configuring an MPM list for a current block.

FIG. 9 is a diagram explaining a method for excluding an intra prediction mode of a neighboring block performing CIIP when configuring an MPM list for a current block.

Combined inter and intra prediction (CIIP) may be applied to a current CU. For example, in case that the CU is coded in a merge mode, and the CU includes at least 64 luma samples (i.e., in case that a product of a CU width and a CU height is equal to or larger than 64), an additional flag may be signaled to indicate whether the CIIP mode is applied to the current CU. The CIIP mode may be called a multi-hypothesis mode or an intra/inter multi-hypothesis mode.

In order to configure the CIIP prediction, the intra prediction mode may be first derived from two additional syntax elements. Maximally 4 intra prediction modes, that is, a DC mode, a planar mode, a horizontal mode, or a vertical mode, may be used. Next, inter prediction and intra prediction signals may be derived using regular intra and inter decoding processes. Next, in order to obtain the CIIP prediction, weighted averaging of the inter prediction and intra prediction signals may be performed.

The maximally 4 intra prediction modes, including the DC mode, the planar mode, the horizontal mode, and the vertical mode, may be used to predict luma components in the CIIP mode. If the CU shape is very wide (e.g., if the width is over twice the height), the horizontal mode may not be allowed. If the CU shape is very narrow (e.g., if the height is over twice the width), the vertical mode may not be allowed. In such cases, only 3 intra prediction modes may be allowed. The CIIP mode may use 3 MPMs for the inter prediction. The CIIP MPM candidate list may be generated based on Table 5 below.

TABLE 5

The left and top neighbouring blocks are set as A and B, respectively
The intra prediction modes of block A and block B, denoted as intraModeA and intraModeB, respectively, are derived as follows:
Let X be either A or B TABLE 5-continued intraModeX is set to DC if 1) block X is not available; or 2) block X is not predicted using the CIIP mode or the intra mode; 3) block B is outside of the current CTU
otherwise, intraModeX is set to 1) DC or PLANAR if the intra prediction mode of block X is DC or PLANAR; or 2) VERTICAL if the intra prediction mode of block X is a "vertical-like" angular mode (larger than 34), or 3) HORIZONTAL if the intra prediction mode of block X is a "horizontal-like" angular mode (smaller than or equal to 34)
If intraModeA and intraModeB are the same:
If intraModeA is PLANAR or DC, then the three MPMs are set to {PLANAR, DC, VERTICAL} in that order
Otherwise, the three MPMs are set to {intraModeA, PLANAR, DC} in that order
Otherwise (intraModeA and intraModeB are different):
The first two MPMs are set to {intraModeA, intraModeB} in that order
Uniqueness of PLANAR, DC and VERTICAL is checked in that order against the first two MPM candidate modes; as soon as a unique mode is found, it is added to as the third MPM If the CU shape is very wide or very narrow as defined above, the MPM flag value may be estimated as 1 without signaling of the MPM flag. If the CU shape is not very wide or very narrow, the MPM flag may be signaled in order to indicate whether the CIIP intra prediction mode is one of the CIIP MPM candidate modes.

If the MPM flag value is 1, an MPM index may be additionally signaled to indicate which of the MPM candidate modes is used for the CIIP intra prediction. If the MPM flag value is 0, the intra prediction mode may be configured as a "missing" mode in the MPM candidate list. For example, if the planar mode does not exist in the MPM candidate list, the planar mode may be the missing mode, and the intra prediction mode may be configured as the planar mode. Since 4 possible intra prediction modes are allowed in the CIIP, and the MPM candidate list includes only 3 intra prediction modes, one of the 4 possible intra prediction modes should be the missing mode. For the chroma components, the DM mode may be applied without additional signaling. That is, the chroma may use the same prediction mode as the prediction mode of luma. The intra prediction mode of the CIIP-coded CU may be stored, and may be used during intra mode coding of future neighboring CUs.

$P_{inter}$ which is an inter prediction signal in a CIIP mode may be derived using the same inter prediction process being applied to a regular merge mode. Further, an intra prediction signal $P_{intra}$ may be derived using the CIIP intra prediction mode following the regular intra prediction process. Next, the intra and inter prediction signals may be combined with each other using a weighted average, and in this case, a weight value may depend on the intra prediction mode, and a sample may be located within a coding block.

If the intra prediction mode is the DC mode or the planar mode, or if the block width or height is smaller than 4, the same weight value may be applied to the intra prediction and inter prediction signals.

If the intra prediction mode is not the DC mode or the planar mode, the weight value may be determined based on the intra prediction mode (in this case, horizontal mode or vertical mode) and a sample position in the block. The horizontal prediction mode may be exemplified (the weight values of the vertical mode may be similarly derived in a vertical direction). W may represent the width of the block, and H may represent the height of the block. The coding block may be first partitioned into four equal-area parts, and respective dimensions may be (W/4)×H. While starting from the closest part to the intra prediction reference samples and ending at the farthest part from the intra prediction reference samples, the WT for the 4 areas may be configured as 6, 5, 3, and 2. The final CIIP prediction signal may be derived based on Equation 1 below.

$$P_{CIIP} = ((8 - \text{wt}) * P_{inter} + \text{wt} * P_{intra} + 4) \gg 3 \quad \text{[Equation 1]}$$

In generating the MPM list according to an embodiment, the intra mode of the current intra block may be derived from intra modes of neighboring intra blocks. The intra modes of the neighboring blocks may be gradually propagated. Since the intra modes of the neighboring intra blocks are similar to each other in terms of their texture, direction, and angle, referring to the intra modes of the neighboring intra blocks may be logical.

As described above, the CIIP combines the inter prediction and the intra prediction with each other by a weighted sum. Although the CIIP has the intra mode, the intra mode of the CIIP does not represent the texture, direction, or angle of the CIIP block. The intra mode of the CIIP may be used for smoothing the inter prediction. It may not be preferable to propagate the intra mode of the CIIP due to the characteristics of the CIIP prediction.

As illustrated in FIG. 9, in case that the CIIP block is the neighboring block of the current intra block, the intra mode of the CIIP block may be disregarded, and thus a default intra mode may be used. In an example, the default intra mode may be the intra planar mode. The location of the neighboring blocks to be referred to may be changed.

In an example, it may be proposed to make the propagation for the intra block of the intra mode of the CIIP impossible in VTM 4.0. In case that the propagation is possible, a penalty may be 0.01%, and luma BD-rates for RA and LDB may be changed by 0.01%, respectively.

The intra mode of the intra block may be propagated through generation of the MPM list derived from the intra modes of the neighboring intra blocks. Since the intra modes of the neighboring intra blocks are similar to each other in terms of their texture, direction, and angle, referring to the intra modes of the neighboring intra blocks may be logical. However, in an embodiment, propagation of the intra mode of the CIIP to the intra block may be made impossible. If the intra mode of the CIIP is propagated to the intra block, the results as in Table 6 and Table 7 below may occur.

TABLE 6

Random Access Main10 Over VTM 4.0

| | Y | U | V | EncT | DecT |
|---|---|---|---|---|---|
| Class A1 | 0.01% | −0.02% | −0.01% | 101% | 101% |
| Class A2 | −0.02% | 0.01% | 0.00% | 100% | 99% |
| Class B | 0.03% | −0.07% | 0.02% | 100% | 103% |
| Class C | 0.01% | −0.05% | 0.00% | 101% | 101% |
| Class E | | | | | |
| Overall | 0.01% | −0.04% | 0.00% | 100% | 101% |
| Class D | −0.01% | −0.10% | −0.08% | 101% | 104% |
| Class F | −0.01% | 0.01% | −0.02% | 101% | 102% |

TABLE 7

Low Delay Main10 Over VTM 4.0

| | Y | U | V | EncT | DecT |
|---|---|---|---|---|---|
| Class A1 | | | | | |
| Class A2 | | | | | |
| Class B | 0.00% | −0.04% | −0.33% | 100% | 101% |
| Class C | −0.03% | 0.29% | −0.02% | 101% | 104% |
| Class E | 0.07% | 0.10% | −0.24% | 101% | 104% |
| Overall | 0.01% | 0.11% | −0.20% | 101% | 103% |
| Class D | −0.04% | −0.03% | −0.56% | 102% | 105% |
| Class F | −0.11% | −0.26% | −0.75% | 100% | 103% |

In an embodiment, a process of deriving a luma intra prediction mode may be like Table 8 below.

TABLE 8

The candidate intra prediction mode candIntraPredModeX is derived as follows:
  If one or more of the following conditions are true,
  candIntraPredModeX is set equal to INTRA_PLANAR.
    The variable availableX is equal to FALSE.
    CuPredMode[ xNbX ][ yNbX ] is not equal to MODE_INTRA
    (condition of 'ciip_flag[xNbX][yNbX] is not equal to 1' has been oommited).
    pcm_flag[ xNbX ][ yNbX ] is equal to 1.
    X is equal to B and yCb − 1 is less than
    ( ( yCb >> CtbLog2SizeY ) << CtbLog2SizeY ).
  Otherwise, candIntraPredModeX is set equal to IntraPredModeY[ xNbX ][ yNbX ].

Table 8 represents a method for adding intra modes in an MPM list. In particular, Table 8 discloses conditions to add an intra planar (INTRA_PLANAR) mode that is a default intra mode to the MPM list. Referring to Table 8, if the prediction mode of the neighboring block is not the intra mode (MODE_INTRA), it may be confirmed that the intra planar mode can be added to the MPM list. That is, if the prediction mode of the neighboring block is not the intra mode, the intra planar mode may be determined as an intra prediction mode candidate to be added to the MPM list without the necessity of confirming whether the prediction mode is the CIIP mode (e.g., without the necessity of confirming whether the prediction mode is not the CIIP mode).

Table 9 below represents another method for adding intra modes in an MPM list.

TABLE 9

The candidate intra prediction mode candIntraPredModeX is derived as follows:
  If one or more of the following conditions are true,
  candIntraPredModeX is set equal to INTRA_PLANAR.
    The variable availableX is equal to FALSE.
    CuPredMode[ xNbX ][ yNbX ] is not equal to MODE_INTRA or
    ciip_flag[ xNbX ][ yNbX ] is equal to 1.
    pcm_flag[ xNbX ][ yNbX ] is equal to 1.
    X is equal to B and yCb − 1 is less than
    ( ( yCb >> CtbLog2SizeY ) << CtbLog2SizeY ).
  Otherwise, candIntraPredModeX is set equal to IntraPredModeY[ xNbX ][ yNbX ].

Referring to Table 9, if the prediction mode of the neighboring block is not the intra mode, or if the CIIP flag value is 1 (i.e., the prediction mode of the neighboring block is the CIIP mode), it can be confirmed that the intra planar mode may be added to the MPM list.

Figure 10:
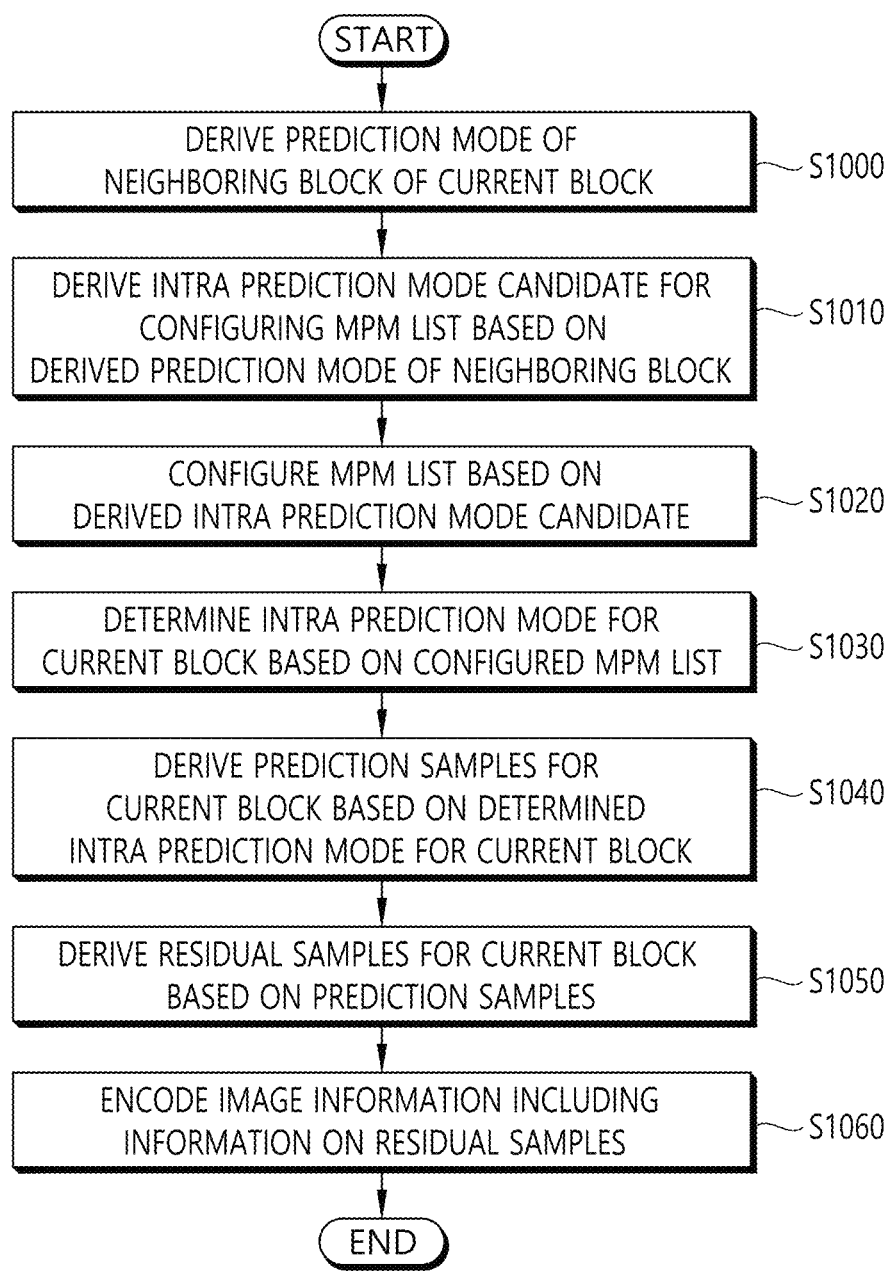
FIG. 10 is a flowchart illustrating an operation of an encoding apparatus according to an embodiment.

FIG. 10 is a flowchart illustrating an operation of an encoding apparatus according to an embodiment, and FIG.

11 is a block diagram illustrating the configuration of an encoding apparatus according to an embodiment.

Figure 11:
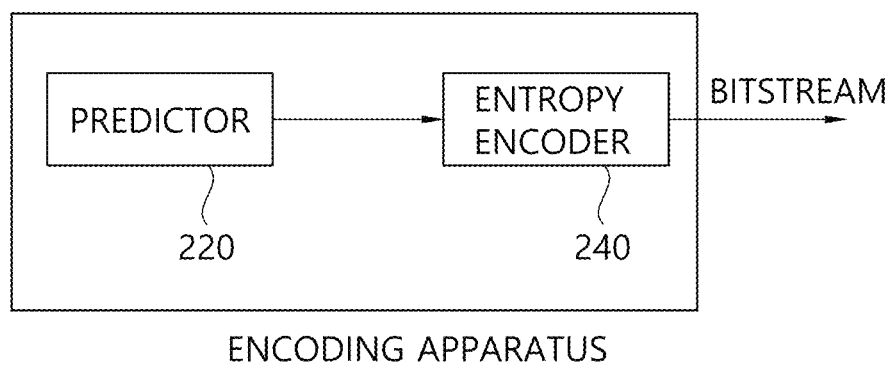
FIG. 11 is a block diagram illustrating the configuration of an encoding apparatus according to an embodiment.
Figure 12:
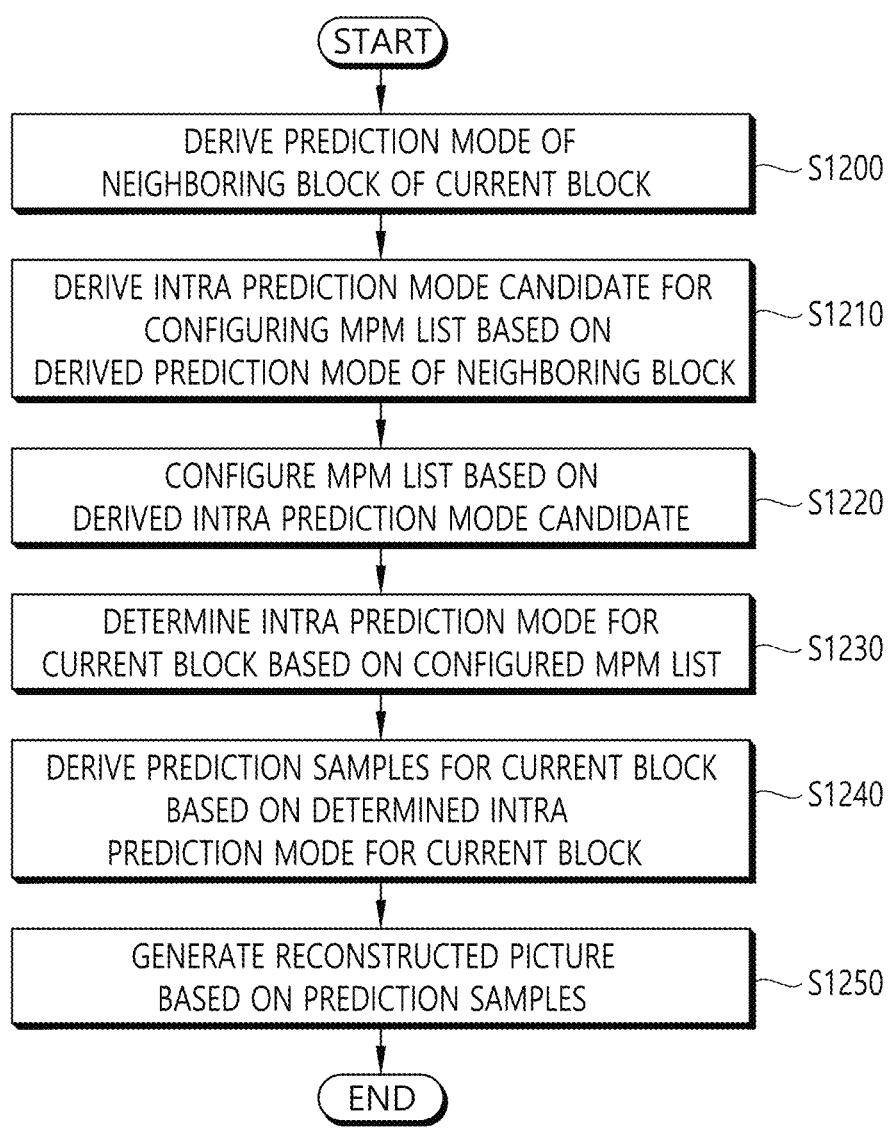
FIG. 12 is a flowchart illustrating an operation of a decoding apparatus according to an embodiment.
Figure 13:
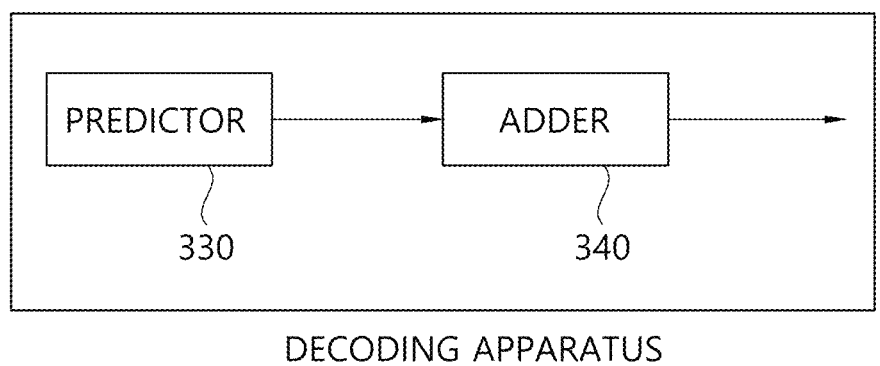
FIG. 13 is a block diagram illustrating the configuration of a decoding apparatus according to an embodiment.

The encoding apparatus according to FIGS. 10 and 11 may perform operations corresponding to a decoding apparatus according to FIGS. 12 and 13. Accordingly, operations of the decoding apparatus to be described later with reference to FIGS. 10 and 11 can be applied even to an encoding apparatus according to FIGS. 12 and 13 in the same manner.

Respective steps disclosed in FIG. 10 may be performed by the encoding apparatus 200 disclosed in FIG. 2. More specifically, S1000 to S1040 may be performed by the predictor 220 disclosed in FIG. 2, S1050 may be performed by the residual processor 230 disclosed in FIG. 2, and S1060 may be performed by the entropy encoder 240 disclosed in FIG. 2. In addition, operations according to S1000 to S1060 are based on parts of the contents described in FIGS. 4 to 9. Accordingly, explanation of the detailed contents duplicate to the contents described in FIGS. 2 and 4 to 9 will be omitted or simplified.

As illustrated in FIG. 11, the encoding apparatus according to an embodiment may include the predictor 220, the residual processor 230, and the entropy encoder 240. However, according to circumstances, all constituent elements illustrated in FIG. 11 may not be essential constituent elements of the encoding apparatus, and the encoding apparatus may be implemented by constituent elements the number of which is more or less than the number of constituent elements illustrated in FIG. 11.

In the encoding apparatus according to an embodiment, the predictor 220, the residual processor 230, and the entropy encoder 240 may be implemented by separate chips, or at least two constituent elements may be implemented through one chip.

The encoding apparatus according to an embodiment may derive a prediction mode of a neighboring block of a current block (S1000). More specifically, the predictor 220 of the encoding apparatus may derive the prediction mode of the neighboring block of the current block.

The encoding apparatus according to an embodiment may derive an intra prediction mode candidate for configuring an MPM list based on the derived prediction mode of the neighboring block (S1010). More specifically, the predictor 220 of the encoding apparatus may derive the intra prediction mode candidate for configuring the MPM list based on the derived prediction mode of the neighboring block.

The encoding apparatus according to an embodiment may configure the MPM list based on the derived intra prediction mode candidate (S1020). More specifically, the predictor 220 of the encoding apparatus may configure the MPM list based on the derived intra prediction mode candidate.

The encoding apparatus according to an embodiment may determine an intra prediction mode for the current block based on the configured MPM list (S1030). More specifically, the predictor 220 of the encoding apparatus may determine the intra prediction mode for the current block based on the configured MPM list.

The encoding apparatus according to an embodiment may derive prediction samples for the current block based on the determined intra prediction mode for the current block (S1040). More specifically, the predictor 220 of the encoding apparatus may derive the prediction samples for the current block based on the determined intra prediction mode for the current block.

The encoding apparatus according to an embodiment may derive residual samples for the current block based on the prediction samples (S1050). More specifically, the residual processor 230 of the encoding apparatus may derive the residual samples for the current block based on the prediction samples.

The encoding apparatus according to an embodiment may encode image information including information on the residual samples (S1060). More specifically, the entropy encoder 240 of the encoding apparatus may encode the image information including the information on the residual samples.

In deriving the intra prediction mode candidate, the encoding apparatus according to an embodiment may derive an intra planar mode as the intra prediction mode candidate based on a determination that the prediction mode of the neighboring block is not for intra prediction.

In deriving the intra prediction mode candidate, the encoding apparatus according to an embodiment may derive the intra planar mode as the intra prediction mode candidate without determining whether the prediction mode of the neighboring block is for a CIIP based on the determination that the prediction mode of the neighboring block is not for the intra prediction.

In deriving the intra prediction mode candidate, the encoding apparatus according to an embodiment may derive the intra planar mode as the intra prediction mode candidate without considering a CIIP flag representing whether the prediction mode of the neighboring block is for the CIIP based on the determination that the prediction mode of the neighboring block is not for the intra prediction.

In deriving the intra prediction mode candidate, the encoding apparatus according to an embodiment may derive the intra planar mode as the intra prediction mode candidate based on a determination that the prediction mode of the neighboring block is not for the intra prediction, but is for the CIIP.

In deriving the intra prediction mode candidate, the encoding apparatus according to an embodiment may derive the intra planar mode as the intra prediction mode candidate based on that the prediction mode of the neighboring block is not for the intra prediction, and a CIIP flag value representing whether the prediction mode of the neighboring block is for the CHIP is 1.

In deriving the intra prediction mode candidate, the encoding apparatus according to an embodiment may derive the intra planar mode as the intra prediction mode candidate based on a determination that the prediction mode of the neighboring block is for the CIIP.

In deriving the intra prediction mode candidate, the encoding apparatus according to an embodiment may derive the intra planar mode as the intra prediction mode candidate based on that the CIIP flag value representing whether the prediction mode of the neighboring block is for the CIIP is 1.

According to the encoding apparatus and the operation method of the encoding apparatus of FIGS. 10 and 11, the encoding apparatus may derive a prediction mode of a neighboring block of a current block (S1000), derive an intra prediction mode candidate for configuring an MPM list based on the derived prediction mode of the neighboring block (S1010), configure the MPM list based on the derived intra prediction mode candidate (S1020), determine an intra prediction mode for the current block based on the configured MPM list (S1030), derive prediction samples for the current block based on the determined intra prediction mode for the current block (S1040), derive residual samples for the current block based on the prediction samples (S1050), and encode image information including information on the residual samples (S1060), and in this case, the deriving of the intra prediction mode candidate may include deriving an intra planar mode as the intra prediction mode candidate based on a determination that the prediction mode of the neighboring block is not for intra prediction. That is, according to FIGS. 10 and 11, if the prediction mode of the neighboring block of the current block is not for the intra prediction, the intra planar mode may be derived as the intra prediction mode candidate for configuring the MPM list without the determination of whether the prediction mode of the neighboring block is for the CIIP.

FIG. 12 is a flowchart illustrating an operation of a decoding apparatus according to an embodiment, and FIG. 13 is a block diagram illustrating the configuration of a decoding apparatus according to an embodiment.

Respective steps disclosed in FIG. 12 may be performed by the decoding apparatus 300 disclosed in FIG. 3. More specifically, S1200 to S1240 may be performed by the predictor 330 disclosed in FIG. 3, and S1250 may be performed by the adder 340 disclosed in FIG. 3. In addition, operations according to S1200 to S1250 are based on parts of the contents described in FIGS. 4 to 9. Accordingly, explanation of the detailed contents duplicate to the contents described in FIGS. 3 to 9 will be omitted or simplified.

As illustrated in FIG. 13, the decoding apparatus according to an embodiment may include the predictor 330 and the adder 340. However, according to circumstances, all constituent elements illustrated in FIG. 13 may not be essential constituent elements of the decoding apparatus, and the decoding apparatus may be implemented by constituent elements the number of which is more or less than the number of constituent elements illustrated in FIG. 13.

In the decoding apparatus according to an embodiment, the predictor 330 and the adder 340 may be implemented by separate chips, or at least two constituent elements may be implemented through one chip.

The decoding apparatus according to an embodiment may derive a prediction mode of a neighboring block of a current block (S1200). More specifically, the predictor 330 of the decoding apparatus may derive the prediction mode of the neighboring block of the current block.

The decoding apparatus according to an embodiment may derive an intra prediction mode candidate for configuring a most probable mode (MPM) list based on the derived prediction mode of the neighboring block (S1210). More specifically, the predictor 330 of the decoding apparatus may derive the intra prediction mode candidate for configuring the MPM list based on the derived prediction mode of the neighboring block.

The decoding apparatus according to an embodiment may configure the MPM list based on the derived intra prediction mode candidate (S1220). More specifically, the predictor 330 of the decoding apparatus may configure the MPM list based on the derived intra prediction mode candidate.

The decoding apparatus according to an embodiment may determine an intra prediction mode for the current block based on the configured MPM list (S1230). More specifically, the predictor 330 of the decoding apparatus may determine the intra prediction mode for the current block based on the configured MPM list.

The decoding apparatus according to an embodiment may derive prediction samples for the current block based on the determined intra prediction mode for the current block (S1240). More specifically, the predictor 330 of the decoding apparatus may derive the prediction samples for the current block based on the determined intra prediction mode for the current block.

The decoding apparatus according to an embodiment may generate a reconstructed picture based on the prediction samples. More specifically, the adder 340 of the decoding apparatus may generate the reconstructed picture based on the prediction samples.

In deriving the intra prediction mode candidate, the decoding apparatus according to an embodiment may derive an intra planar mode as the intra prediction mode candidate based on a determination that the prediction mode of the neighboring block is not for intra prediction. In other words, the intra planar mode may be a default intra mode to be added to the MPM list.

In deriving the intra prediction mode candidate, the decoding apparatus according to an embodiment may derive the intra planar mode as the intra prediction mode candidate without determining whether the prediction mode of the neighboring block is for a combined intra inter prediction (CIIP) based on the determination that the prediction mode of the neighboring block is not for the intra prediction. The present embodiment may be based on the contents described in the Table 8.

In deriving the intra prediction mode candidate, the decoding apparatus according to an embodiment may derive the intra planar mode as the intra prediction mode candidate without considering a CHIP flag representing whether the prediction mode of the neighboring block is for the CIIP based on the determination that the prediction mode of the neighboring block is not for the intra prediction. In an example, the determination that the prediction mode is not for the intra prediction may be based on mode intra information (MODE_INTRA), and the CIIP flag may be expressed as ciip_flag.

In deriving the intra prediction mode candidate, the decoding apparatus according to an embodiment may derive the intra planar mode as the intra prediction mode candidate based on a determination that the prediction mode of the neighboring block is not for the intra prediction, but is for the CIIP.

In deriving the intra prediction mode candidate, the decoding apparatus according to an embodiment may derive the intra planar mode as the intra prediction mode candidate based on that the prediction mode of the neighboring block is not for the intra prediction, and a CIIP flag value representing whether the prediction mode of the neighboring block is for the CIIP is 1.

In deriving the intra prediction mode candidate, the decoding apparatus according to an embodiment may derive the intra planar mode as the intra prediction mode candidate based on a determination that the prediction mode of the neighboring block is for the CIIP.

In deriving the intra prediction mode candidate, the decoding apparatus according to an embodiment may derive the intra planar mode as the intra prediction mode candidate based on that the CIIP flag value representing whether the prediction mode of the neighboring block is for the CIIP is 1.

According to the decoding apparatus and the operation method of the decoding apparatus of FIGS. 12 and 13, the decoding apparatus may derive a prediction mode of a neighboring block of a current block (S1200), derive an intra prediction mode candidate for configuring an MPM list based on the derived prediction mode of the neighboring block (S1210), configure the MPM list based on the derived intra prediction mode candidate (S1220), determine an intra prediction mode for the current block based on the configured MPM list (S1230), derive prediction samples for the current block based on the determined intra prediction mode for the current block (S1240), and generate a reconstructed picture based on the prediction samples (S1250), and in this case, the deriving of the intra prediction mode candidate may include deriving an intra planar mode as the intra prediction mode candidate based on a determination that the prediction mode of the neighboring block is not for intra prediction. That is, according to FIGS. 12 and 13, if the prediction mode of the neighboring block of the current block is not for the intra prediction, the intra planar mode may be derived as the intra prediction mode candidate for configuring the MPM list without the determination of whether the prediction mode of the neighboring block is for the CIIP.

Although methods have been described on the basis of a flowchart in which steps or blocks are listed in sequence in the above-described embodiments, the steps of the present disclosure are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present disclosure.

The aforementioned method according to the present disclosure may be in the form of software, and the encoding apparatus and/or decoding apparatus according to the present disclosure may be included in a device for performing image processing, for example, a TV, a computer, a smart phone, a set-top box, a display device, or the like.

When the embodiments are implemented in software in the present disclosure, the aforementioned method may be implemented using a module (procedure, function, etc.) which performs the aforementioned function. The module may be stored in a memory and executed by a processor. The memory may be disposed to the processor internally or externally and connected to the processor using various well-known means. The processor may include application-specific integrated circuit (ASIC), other chipsets, logic circuits, and/or data processors. The memory may include a read-only memory (ROM), a random access memory (RAM), a flash memory, a memory card, storage media and/or other storage devices. That is, the embodiments described herein may be implemented and performed on a processor, a microprocessor, a controller, or a chip. For example, the functional units shown in each drawing may be implemented and performed on a computer, a processor, a microprocessor, a controller, or a chip. In this case, information for implementation (e.g., information on instructions) or an algorithm may be stored in a digital storage medium.

Further, the decoding apparatus and the encoding apparatus to which the present disclosure is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, camcorder, a video on demand (VoD) service provider, an over the top video (OTT) device, an internet streaming service provider, a 3D video device, a virtual reality (VR) device, an augment reality (AR) device, an image telephone video device, a vehicle terminal (e.g., a vehicle (including an autonomous vehicle) terminal, an airplane terminal, a ship terminal, etc.) and a medical video device, and the like, and may be used to process a video signal or a data signal. For example, the OTT video device may include a game console, a Blu-ray player, an Internet-connected TV, a home theater system, a smartphone, a tablet PC, a digital video recorder (DVR), and the like.

Further, the processing method to which the present disclosure is applied may be produced in the form of a program being executed by a computer and may be stored in a computer-readable recording medium. Multimedia data having a data structure according to the present disclosure may also be stored in the computer-readable recording medium. The computer readable recording medium includes all kinds of storage devices and distributed storage devices in which computer readable data is stored. The computer-readable recording medium may be, for example, a Blu-ray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (e.g., transmission over the Internet). Further, a bitstream generated by the encoding method may be stored in the computer-readable recording medium or transmitted through a wired or wireless communication network.

In addition, the embodiments of the present disclosure may be embodied as a computer program product based on a program code, and the program code may be executed on a computer by the embodiments of the present disclosure. The program code may be stored on a computer-readable carrier.

Figure 14:
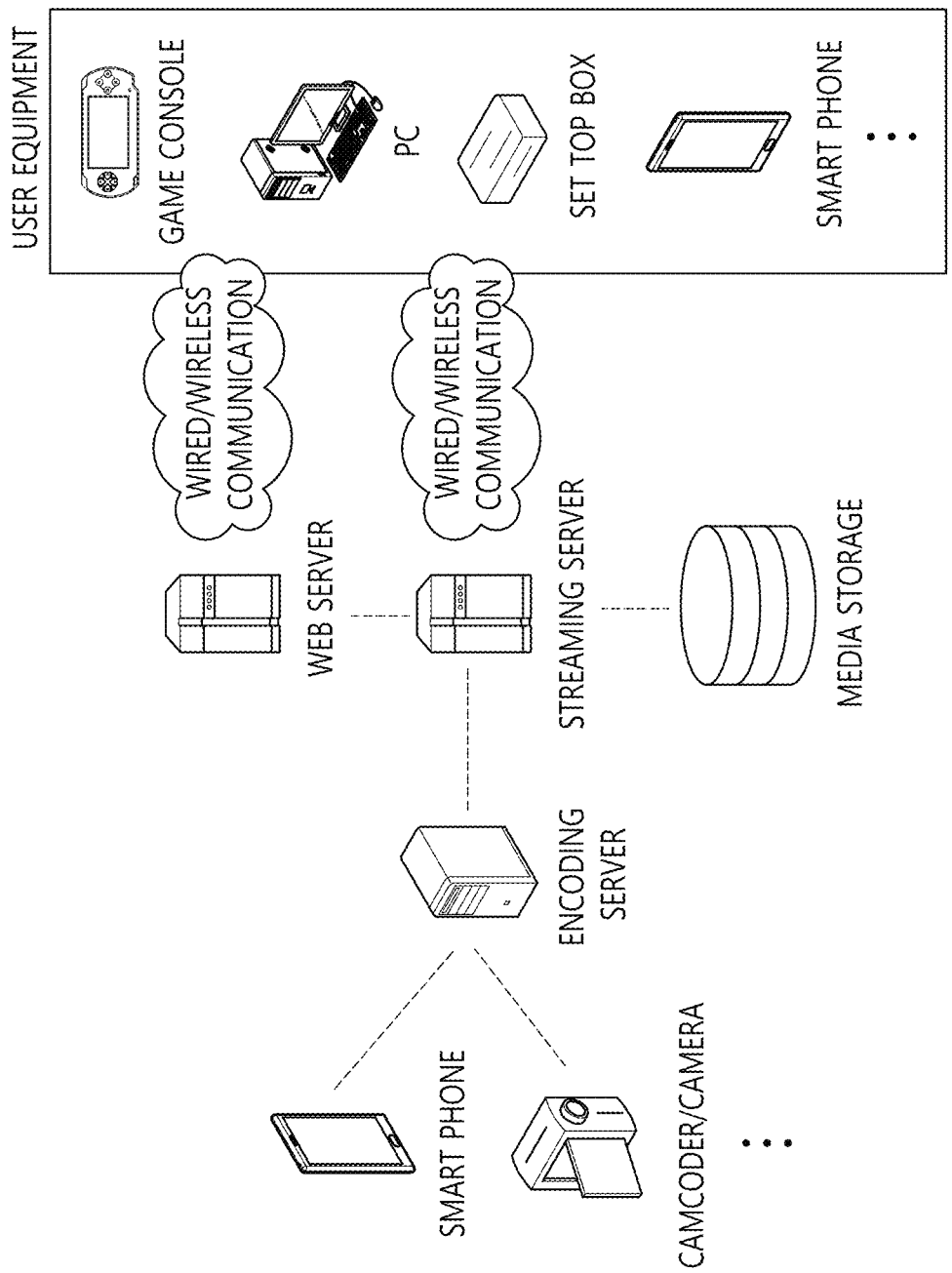
FIG. 14 illustrates an example of a content streaming system to which the present disclosure is applicable.

FIG. 14 represents an example of a contents streaming system to which the disclosure of the present document may be applied.

Referring to FIG. 14, the content streaming system to which the embodiments of the present disclosure is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present disclosure is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

What is claimed is:

1. A decoding apparatus for an image decoding, the decoding apparatus comprising:
    a memory; and
    at least one processor connected to the memory, the at least one processor configured to:
    derive a prediction mode of a neighboring block of a current block;
    derive an intra prediction mode candidate for configuring a most probable mode (MPM) list based on the derived prediction mode of the neighboring block;
    configure the MPM list based on the derived intra prediction mode candidate;
    determine an intra prediction mode for the current block based on the configured MPM list;
    derive prediction samples for the current block based on the determined intra prediction mode for the current block; and
    generate a reconstructed picture based on the prediction samples,
    wherein an INTRA PLANAR mode is derived as the intra prediction mode candidate based on a determination that the prediction mode of the neighboring block is not for an intra prediction and the prediction mode of the neighboring block is for a combined intra inter prediction (CIIP).

2. An encoding apparatus for an image encoding, the encoding apparatus comprising:
    a memory; and
    at least one processor connected to the memory, the at least one processor configured to:
    derive a prediction mode of a neighboring block of a current block;
    derive an intra prediction mode candidate for configuring an MPM list based on the derived prediction mode of the neighboring block;
    configure the MPM list based on the derived intra prediction mode candidate;
    determine an intra prediction mode for the current block based on the configured MPM list;
    derive prediction samples for the current block based on the determined intra prediction mode for the current block;
    derive residual samples for the current block based on the prediction samples; and
    encode image information including information on the residual samples,
    wherein an INTRA PLANAR mode is derived as the intra prediction mode candidate based on a determination that the prediction mode of the neighboring block is not for an intra prediction and the prediction mode of the neighboring block is for a CIIP.

3. An apparatus for transmitting data for an image, the apparatus comprising:
    at least one processor configured to obtain a bitstream for the image, wherein the bitstream is generated based on deriving a prediction mode of a neighboring block of a current block, deriving an intra prediction mode candidate for configuring an MPM list based on the derived prediction mode of the neighboring block, configuring the MPM list based on the derived intra prediction mode candidate, determining an intra prediction mode for the current block based on the configured MPM list, deriving prediction samples for the current block based on the determined intra prediction mode for the current block, deriving residual samples for the current block based on the prediction samples, and encoding the image information to generate the bitstream, wherein the image information includes information on the residual samples; and
    a transmitter configured to transmit the data comprising the bitstream,
    wherein an INTRA PLANAR mode is derived as the intra prediction mode candidate based on a determination that the prediction mode of the neighboring block is not for an intra prediction and the prediction mode of the neighboring block is for a CIIP.

* * * * *